US007377602B2

(12) United States Patent
Chen et al.

(10) Patent No.: US 7,377,602 B2
(45) Date of Patent: May 27, 2008

(54) BEZEL MOUNTING ASSEMBLY WITH SLIDABLE LOCK MEMBER

(75) Inventors: Yun Lung Chen, Tu-chen (TW); Quan Guang Du, Shenzhen (CN)

(73) Assignees: Hong Fu Jin Precision Industry (ShenZhen) Co., Ltd., ShenZhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 357 days.

(21) Appl. No.: 10/921,424

(22) Filed: Aug. 17, 2004

(65) Prior Publication Data

US 2005/0040744 A1 Feb. 24, 2005

(30) Foreign Application Priority Data

Aug. 20, 2003 (TW) .............................. 92215076 U

(51) Int. Cl.
*A47B 97/00* (2006.01)
(52) U.S. Cl. ............................... 312/223.2; 312/265.6; 292/121
(58) Field of Classification Search ............. 312/223.1, 312/223.2, 223.3, 265.5, 263, 319.1, 319.2; 361/683, 685, 724, 725; 292/19, 26, 42, 292/95, 120, 121, 128, 163, 302, DIG. 11
See application file for complete search history.

(56) References Cited

U.S. PATENT DOCUMENTS 5,123,680 A    6/1992  Liu
5,825,626 A *  10/1998 Hulick et al. ............ 312/223.2
6,234,593 B1 *  5/2001 Chen et al. ............... 312/223.2
6,288,333 B1 *  9/2001 Liu et al. .................. 312/223.2
6,375,287 B1 *  4/2002 Lai .......................... 312/223.2
6,542,356 B2 *  4/2003 Gan ........................... 361/683
6,555,474 B1 *  4/2003 Huang et al. ............... 438/687
6,671,179 B2 * 12/2003 Chen ........................... 361/725
6,899,407 B1 *  5/2005 Lai .......................... 312/223.2
7,009,845 B2 *  3/2006 Chen et al. .................. 361/726

FOREIGN PATENT DOCUMENTS

DE        450384    * 10/1991     ................. 361/683
TW        200980      2/1993
TW        285315      9/1996

* cited by examiner

*Primary Examiner*—Lanna Mai
*Assistant Examiner*—Hanh V. Tran
(74) *Attorney, Agent, or Firm*—Wei Te Chung

(57) ABSTRACT

A bezel mounting assembly includes a bezel (10), a front panel (30) defining a pair of apertures (31), and a locking device (20) attached to the bezel for securing the bezel to the front panel. The bezel includes a pair of pillars (121) and a pair of blocks (11) having a pair of posts (14). The locking device includes a pair of symmetric side plates (22) defining through slots (25) for slidably receiving the posts, a pair of resilient arms (27) extending from the side plates, an operating member (23), and a pair of catches (26). The locking device is slidably attached on the blocks, with the posts engagingly received in the through slots. The resilient arms are secured to the pillars at free ends thereof. The operating member is moved vertically so as to drive the catches to engage in and disengage from the apertures of the front panel.

9 Claims, 4 Drawing Sheets

BEZEL MOUNTING ASSEMBLY WITH SLIDABLE LOCK MEMBER

BACKGROUND OF THE INVENTION

1. Field of the Invention

The present invention relates to a mounting assembly, and more particularly to a computer bezel mounting assembly with a simplified configuration and convenient usability. The invention relates to a contemporarily filed application titled "BEZEL MOUNTING DEVICE" having one same inventor and the same assignee with the instant application.

2. Description of Prior Art

A conventional front bezel is mounted to a computer case by means of a plurality of set screws or fasteners being attached to the bezel and engaged in a plurality of fixing holes defined in the computer case. A typical bezel mounting assembly is disclosed in Taiwan Patent No. 285,315. The mounting assembly comprises a chassis and a front bezel. Two sidewalls of the chassis define a plurality of receiving slots in respective front portions thereof. Side edges of the bezel have a plurality of barbs engaging in the corresponding slots of the chassis, thereby connecting the front bezel to the chassis. However, this mounting assembly requires the bezel to have numerous barbs, which makes detachment of the bezel from the chassis inconvenient and laborious. Additionally, the barbs are easily broken when too much force is applied thereon during the detachment process.

Another typical bezel mounting assembly is disclosed in Taiwan Patent No. 200,980. The bezel mounting assembly comprises a front bezel, a chassis and a plurality of metal clip members mounted on top of corresponding pillars formed on the bezel. A circumferential edge of the chassis defines a plurality of slots corresponding to the arrangement of the pillars. Each metal clip comprises a planar fixing portion, a vertical supporting portion, and a guiding portion. A mounting dent is defined between the supporting portion and the guiding portion. The guiding portion passes through the corresponding slot of the chassis until an inner edge of the chassis at the slot is blocked in the mounting dent. The bezel is thereby mounted to the chassis. This mounting assembly requires a plurality of additional separate members (i.e., the metal clips) with specific configurations in order to mount the bezel, which makes manufacturing of the mounting assembly more time-consuming costly. Moreover, it is rather inconvenient and laborious to detach all the clip members tightly engaged in the slots. Another similar structure is also disclosed in U.S. Pat. No. 5,123,680.

SUMMARY OF THE INVENTION

Accordingly, an object of the present invention is to provide a bezel mounting assembly with a simplified configuration and convenient usability.

To achieve the above object, a bezel mounting assembly of the present invention includes a bezel, a front panel defining a pair of apertures, and a locking device attached to the bezel for securing the bezel to the front panel. The bezel includes a pair of pillars, and a pair of blocks having a pair of posts. The locking device includes a pair of symmetric side plates defining through slots for slidably receiving the posts, a pair of resilient arms extending from the side plates, an operating member, and a pair of catches. The locking device is slidably attached on the blocks, with the posts engagingly received in the through slots. The resilient arms are secured to the pillars at free ends thereof. The operating member is moved vertically so as to drive the catches to engage in and disengage from the slots of the front panel.

Other objects, advantages and novel features of the present invention will be drawn from the following detailed description of a preferred embodiment of the present invention with the attached drawings, in which:

DESCRIPTION OF THE PREFERRED EMBODIMENT

Figure 1:
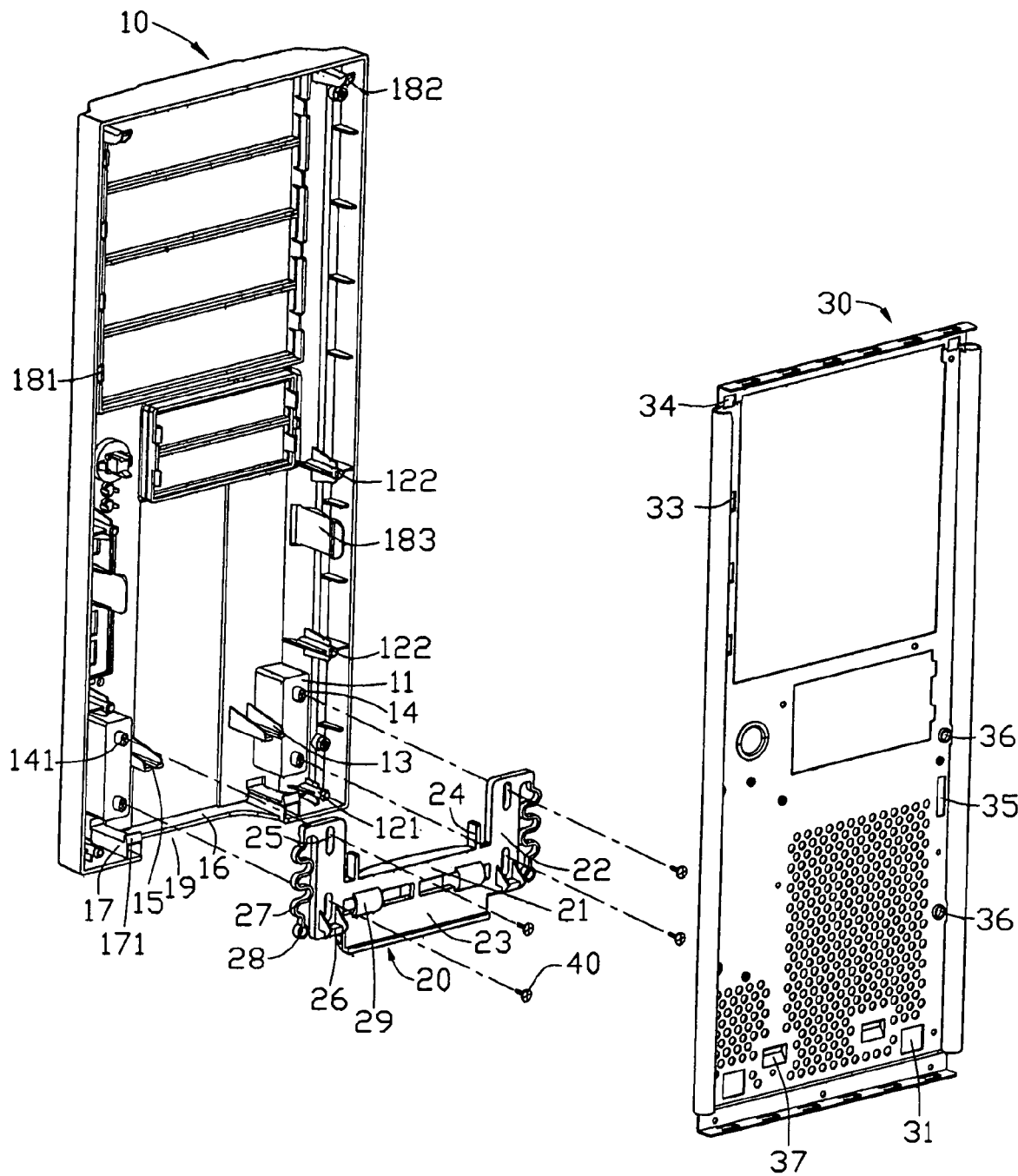
FIG. 1 is an exploded, isometric view of a bezel mounting assembly in accordance with the present invention, the bezel mounting assembly comprising a bezel, a lock member and a front panel.
Figure 3:
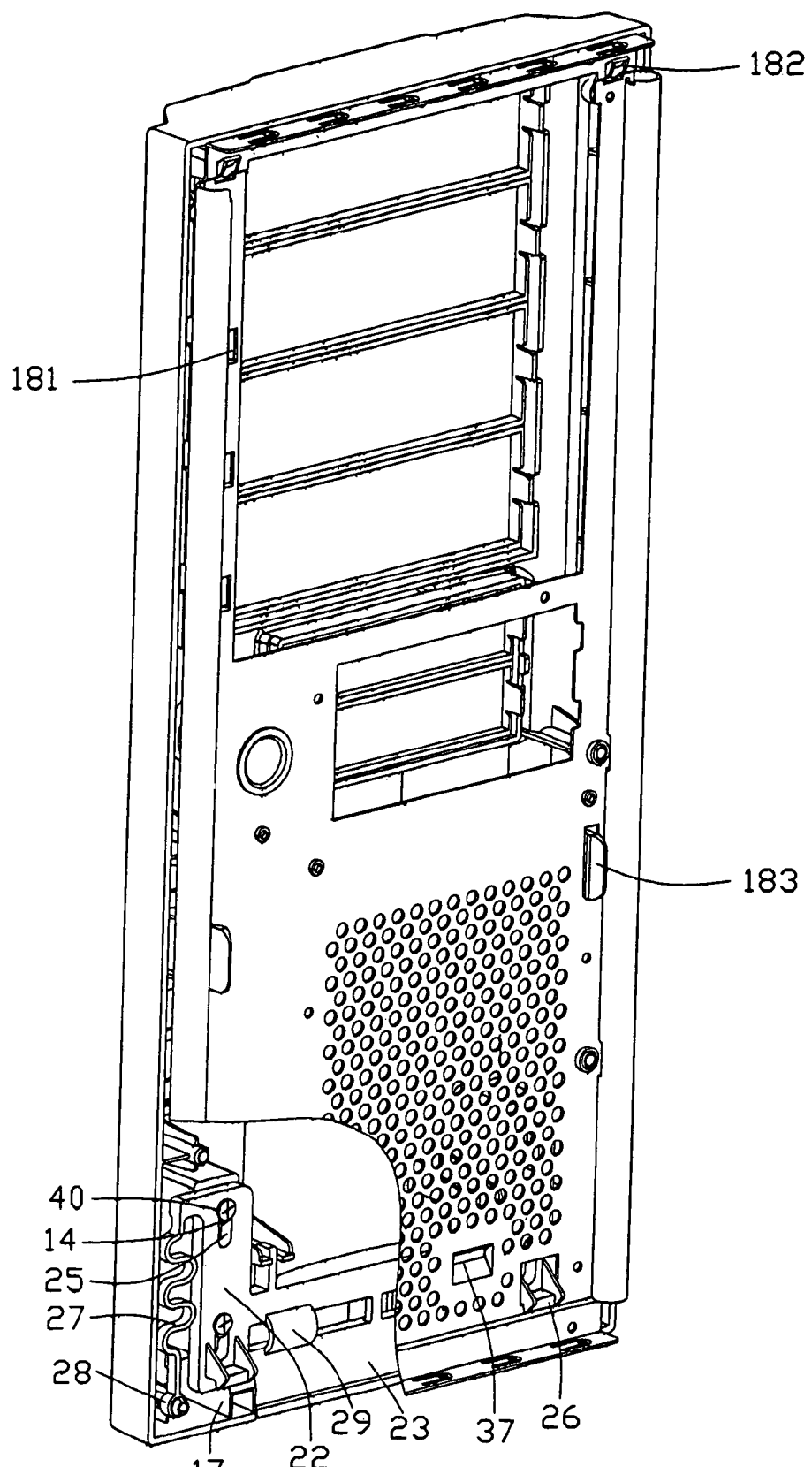
FIG. 3 is an assembled view of FIG. 1, with part of the bezel cut away, and showing the lock member in a locked state.

Referring to FIGS. 1 and 3, a bezel mounting assembly in accordance with a preferred embodiment of the present invention comprises a bezel 10, a front panel 30 of a computer chassis (not shown), a plurality of studs 40, and a lock member 20 securing the bezel 10 to the front panel 30.

The bezel 10 is generally rectangular. A pair of spaced blocks 11 integrally and inwardly extends from a bottom inner face of the bezel 10. Each block 11 forms a pair of posts 14, one above the other. A fixing hole 141 is defined in each post 14. A pair of boards 13 extends inwardly from the bezel 10 between the blocks 11. A gap 15 is defined in each board 13. A flange 16 extends perpendicularly inwardly from a bottom edge of the bezel 10 below the blocks 11. The flange 16 defines a generally rectangular cutout 19 in a middle rear portion thereof. A pair of hollow tables 17 extends upwardly from the flange 16, respectively at opposite sides of the cutout 19 under the blocks 11. Each table 17 forms an upright stop 171 from an inmost top portion thereof. A pair of pillars 121 is inwardly formed from a bottom portion of the bezel 10. A plurality of pillars 122 is inwardly formed from opposite side portions of the bezel 10. A plurality of hooks 181 is inwardly formed from one of the side portions of the bezel 10, above corresponding pillars 122. A pair of hooks 182 is inwardly formed from a top portion of the bezel 10. A pair of hooks 183 is inwardly formed from the opposite side portions of the bezel 10 respectively.

The front panel 30 defines a plurality of fixing slits 33 therein, corresponding to the hooks 181 of the bezel 10. The front panel 30 also defines a plurality of fixing slits 34, 35 therein, corresponding to the hooks 182, 183 of the bezel 10. A plurality of seats 36 with through holes (not labeled) extends inwardly from the front panel 30, corresponding to the pillars 122 of the bezel 10. A pair of apertures 31 is defined in a bottom portion of the front panel 30. A pair of spaced first protrusions 37 extends outwardly from the front panel 30, generally between the apertures 31.

The locking device 20 has a symmetric configuration, and is attached to the bezel 10. The locking device 20 comprises a central beam 21, a pair of side plates 22 formed at opposite sides of the beam 21 respectively, and an operating member 23 extending downwardly from the beam 21. A ledge (not labeled) extends perpendicularly forwardly from an upper edge of the beam 21 between the side plates 22. A pair of upright poles 24 is formed on opposite sides of the ledge respectively, for sliding in the gaps 15 of the boards 13 of the bezel 10. A pair of convex second protrusions 29 extends rearward from the beam 21, for engaging with the first protrusions 37 of the front panel 30. Each side plate 22 defines a pair of vertical through slots 25, for slidably receiving the posts 14 of the bezel 10. A pair of catches 26 extends rearward from bottom ends of the side plates 22 respectively, for engaging in the apertures 31 of the front panel 30. A pair of resilient arms 27 extends downwardly from outmost top corners of the side plates 22 respectively. A ring 28 is formed at a distal end of each resilient arm 27, the rings 28 corresponding to the pillars 121 of the bezel 10.

Figure 2:
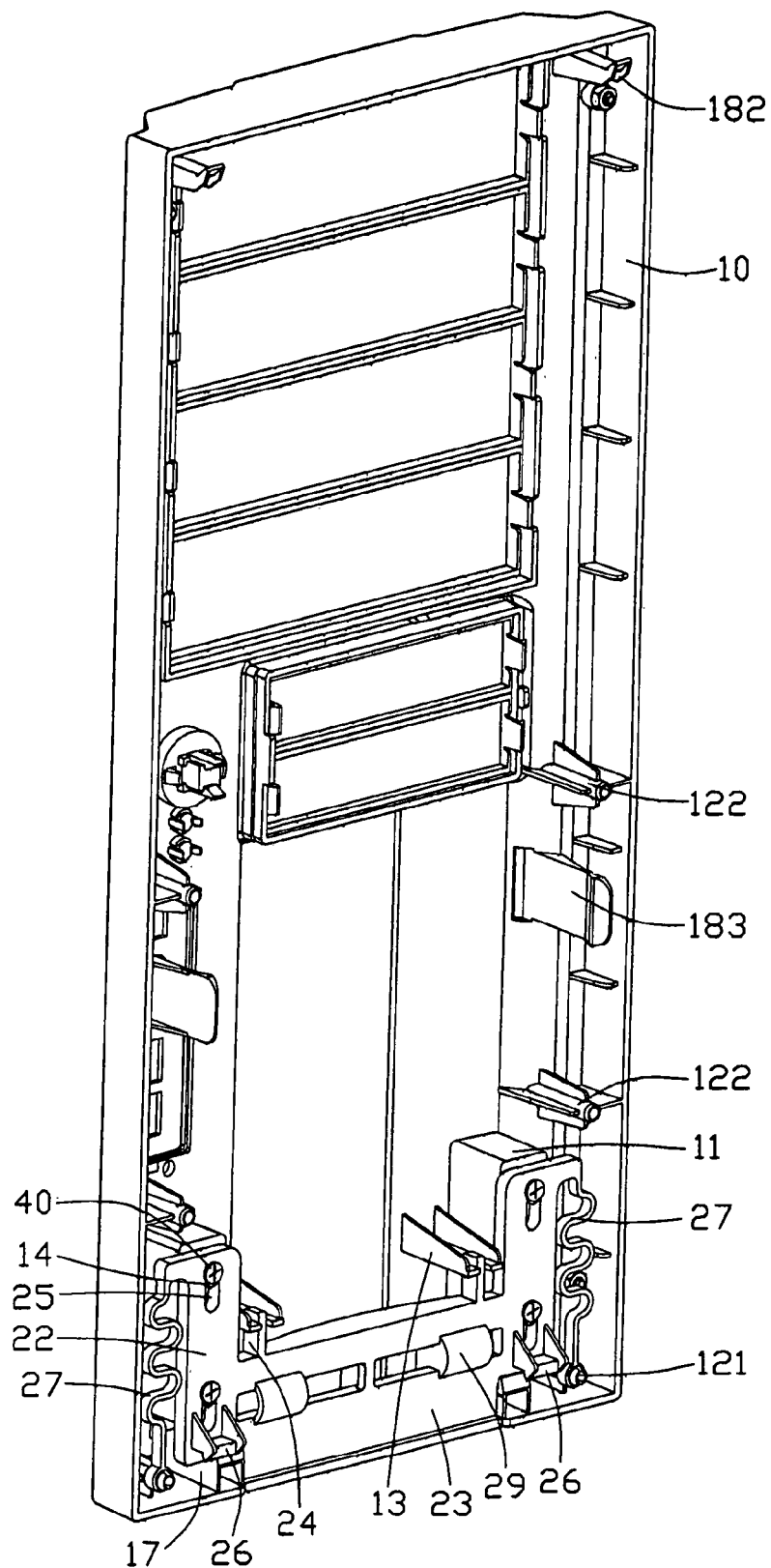
FIG. 2 is an assembled view of the bezel and the lock member of FIG. 1.

Referring to FIG. 2, in pre-assembly, the locking device 20 is attached to the bezel 10. The side plates 22 slidably abut against rear faces of the blocks 11, with the posts 14 being slidably received in the through slots 25, and the poles 24 being slidably received in the gaps 15. The rings 28 are engaged around the pillars 121. The studs 40 are extended through the through slots 25 and secured in the fixing holes 141 of the posts 14. Bottoms of the side plates 22 are blocked by the stops 171 of the tables 17 from moving rearward. Thus the locking device 20 is prevented from being accidentally detached from the bezel 10.

Referring to FIG. 3, in assembly, the combined bezel 10 and locking device 20 is then attached to the front panel 30. The operating member 23 of the locking device 20 is pushed upwardly thereby stretching the resilient arms 27, and the bezel 10 is pushed onto the front panel 20. The pillars 122 of the bezel 10 are engaged in the through holes of the seats 36 of the front panel 30. The hooks 181, 182, 183 of the bezel 10 are respectively engaged in the corresponding slits 33, 34, 35 of the front panel 30. The catches 26 are extended into the apertures 31 of the front panel 30. Then the operating member 23 is released, and the resilient arms 27 rebound. Consequently, the catches 26 are engaged in the apertures 31, and the bezel 10 is securely attached to the front panel 30.

Figure 4:
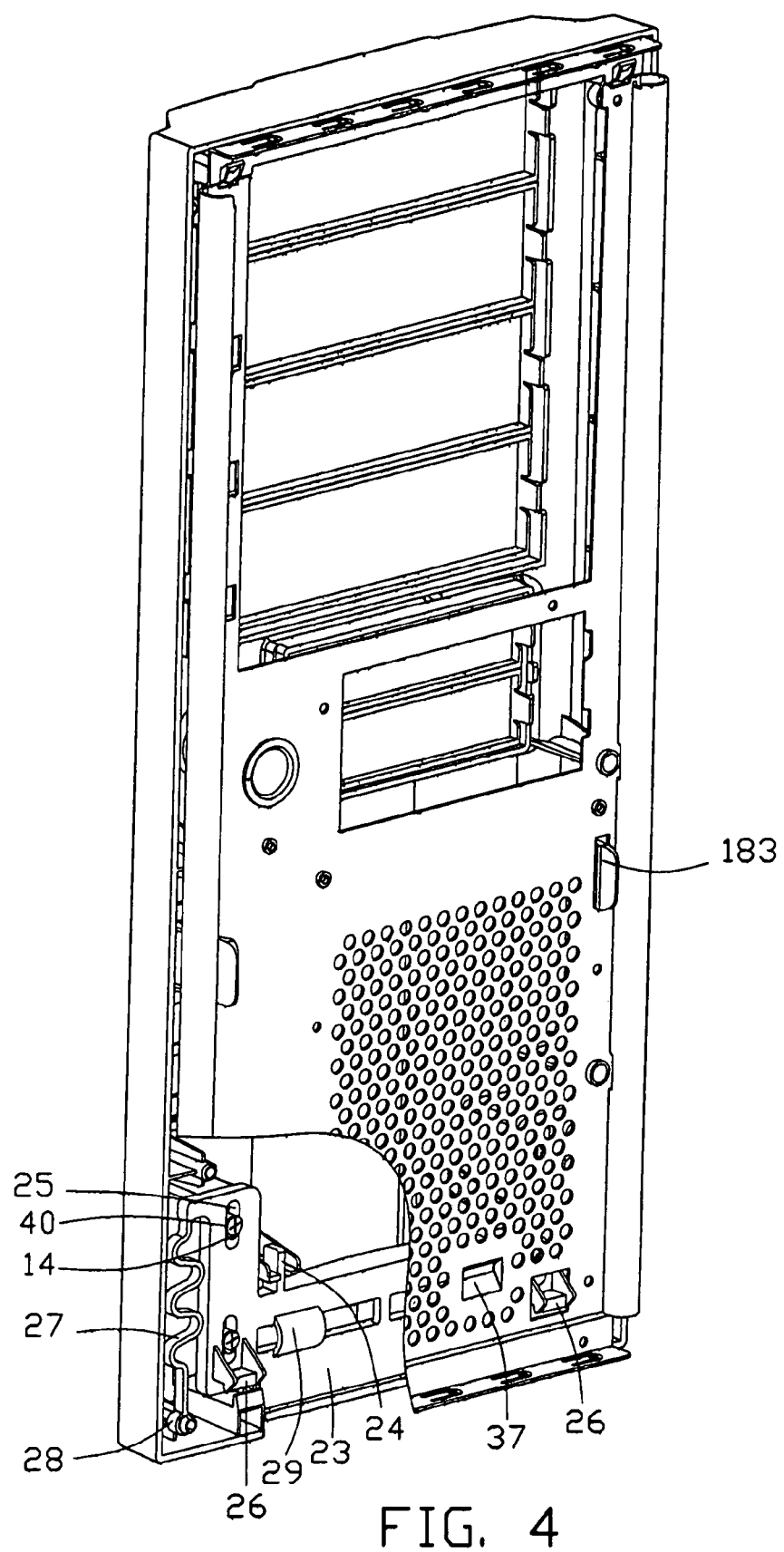
FIG. 4 is similar to FIG. 3, but showing the lock member in an unlocked state.

Referring to FIG. 4, in disassembly, the locking device 20 needs to be released from the front panel 30. The operating member 23 is pushed upwardly, so that the catches 26 are released from engagement in the apertures 31 of the panel 30. The second protrusions 29 ride upwardly along the first protrusions 37, and a bottom of the bezel 10 is thereby driven outwardly from the front panel 30. Then, the bezel 10 is fully detached from the front panel 30. The hooks 181, 182, 183 of the bezel 10 are disengaged from the slits 33, 34, 35 of the front panel 30. The pillars 122 are disengaged from the through holes of the seats 36 of the front panel 30. That is, detachment of the bezel 10 is essentially the reverse of the above-described attachment procedure.

While the present invention has been illustrated by the description of the preferred embodiment thereof, and while the preferred embodiment has been described in considerable detail, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative examples shown and described.

What is claimed is:

1. A bezel mounting assembly comprising:
a front panel defining a pair of apertures therein;
a bezel attached to the front panel, the bezel comprising a pair of blocks protruding therefrom and a pair of first pillars, each of the blocks comprising posts extending therefrom; and
a locking device attached to the bezel and securing the bezel to the front panel, the locking device comprising a beam, a pair of side plates extending from opposite sides of the beam along a first direction, a pair of resilient arms extending from the side plates, and an operating member extending from the beam along a second direction opposite to the first direction, each of the side plates comprising a through slot and a catch;
wherein the side plates are movably attached on the blocks with the posts slidably received in the through slots, free ends of the resilient arms are secured to the first pillars, the catches engage in the apertures of the front panel, and wherein when the operating member is pushed, the catches disengage from the apertures of the front panel.

2. The bezel mounting assembly as claimed in claim 1, wherein the bezel comprises a plurality of hooks for engaging in a plurality of slits defined in the front panel.

3. The bezel mounting assembly as claimed in claim 1, wherein the bezel further comprises a plurality of second pillars, and the front panel comprises a plurality of seats defining through holes therein corresponding to the second pillars.

4. The bezel mounting assembly as claimed in claim 1, wherein the bezel comprises a pair of boards each defining a gap therein, and the beam of the locking device comprises a pair of poles, the poles being vertically movable in the gaps.

5. The bezel mounting assembly as claimed in claim 1, wherein the bezel comprises a flange at a bottom edge thereof, and a middle of the flange defines a cutout for providing the operating member with access to extend therethrough.

6. The bezel mounting assembly as claimed in claim 5, wherein a pair of tables is disposed at opposite sides of the cutout below the blocks, and each of the tables comprises an upright stop thereon.

7. The bezel mounting assembly as claimed in claim 1, wherein the first pillars are located at bottom corners of the bezel, and each of the resilient arms extends from a corresponding side plate in the second direction and forms a ring at a distal end thereof for engaging with a corresponding pillar of the bezel.

8. The bezel mounting assembly as claimed in claim 1, wherein the front panel and the beam of the locking device provide a pair of protrusions, the protrusions opposing and abutting against each other.

9. The bezel mounting assembly as claimed in claim 1, wherein the posts of the bezel define through holes for engagingly receiving studs therein, in order to limit the horizontal movement of the locking device relative to the bezel.

* * * * *